Dec. 23, 1952        A. F. TRIPHAHN        2,622,481
SHIELD FOR VEHICLE REARVIEW MIRRORS
Filed July 7, 1951        2 SHEETS—SHEET 1
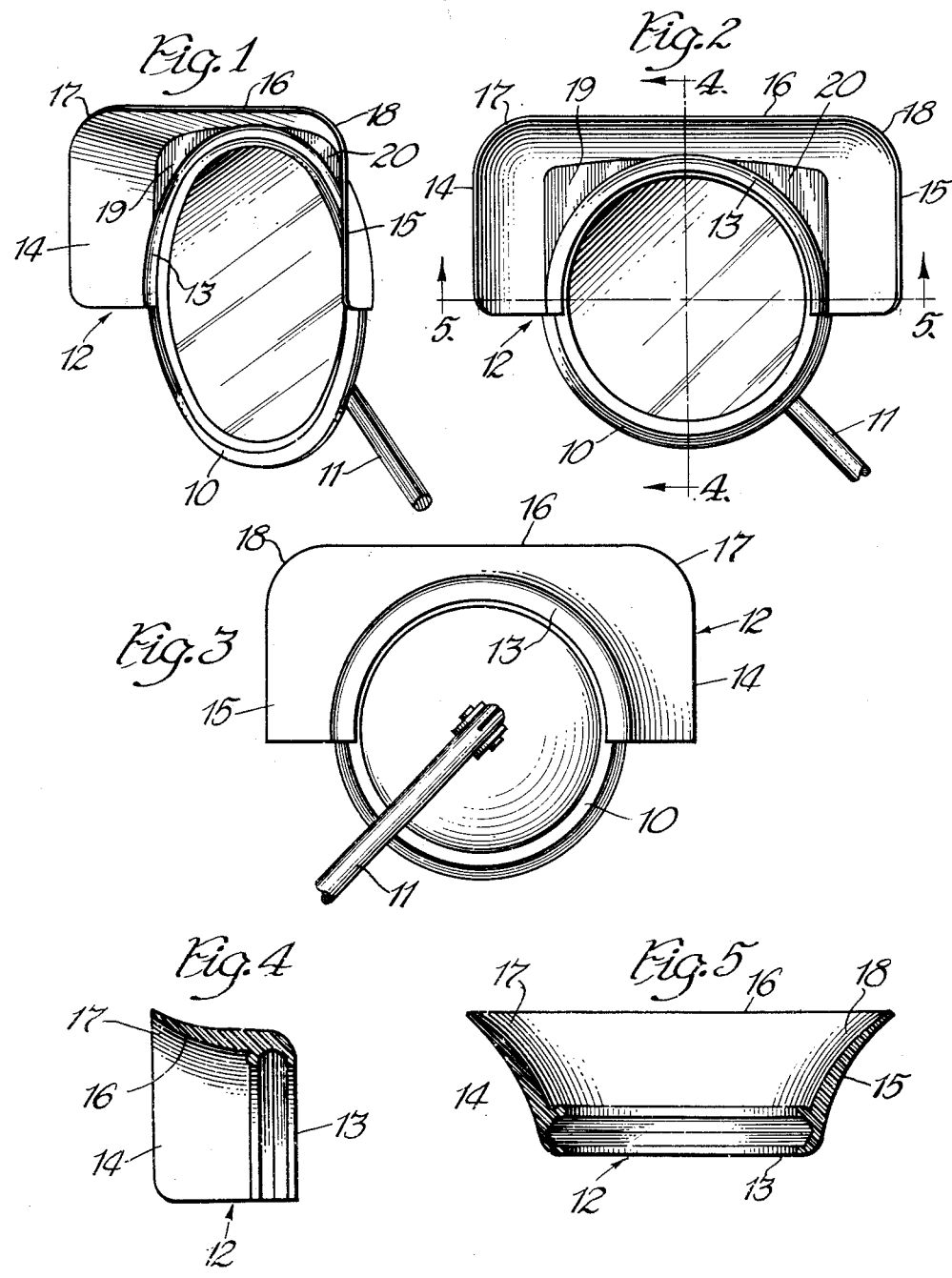
Inventor
Arthur F. Triphahn
by F. Thrall Brewer
Atty.

Dec. 23, 1952            A. F. TRIPHAHN            2,622,481
SHIELD FOR VEHICLE REARVIEW MIRRORS
Filed July 7, 1951                                  2 SHEETS—SHEET 2
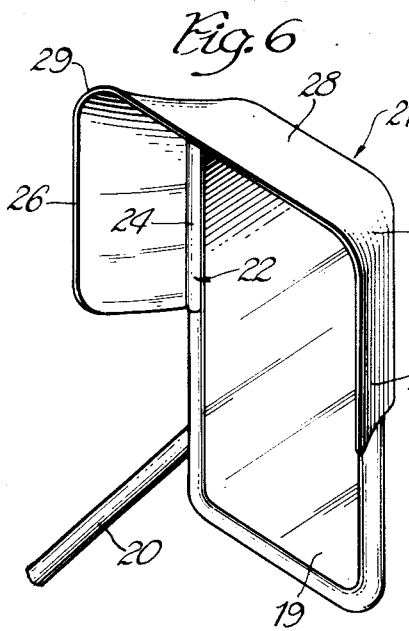
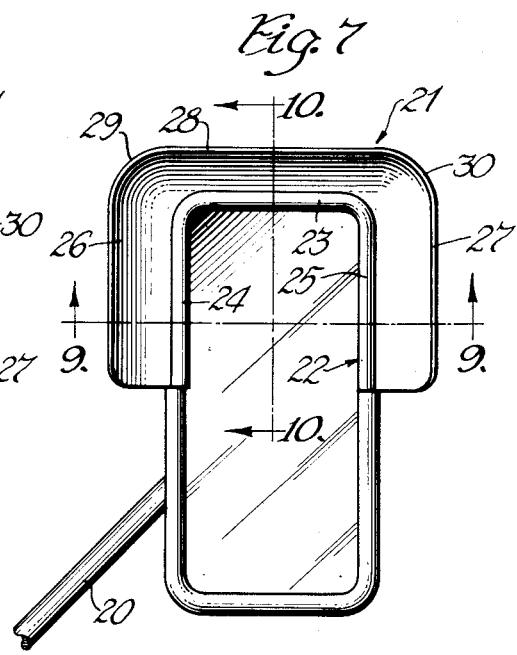
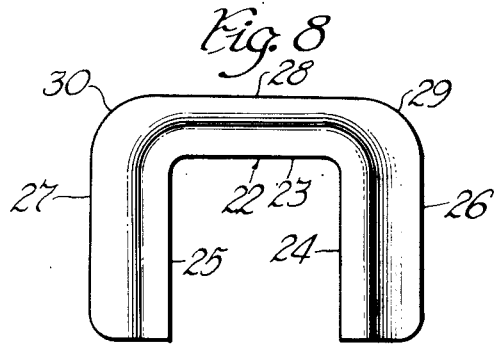
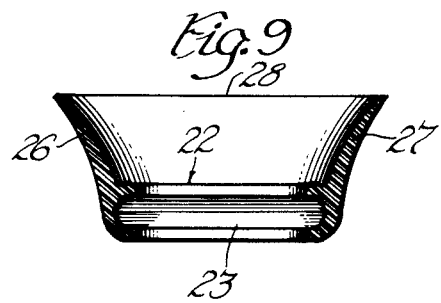
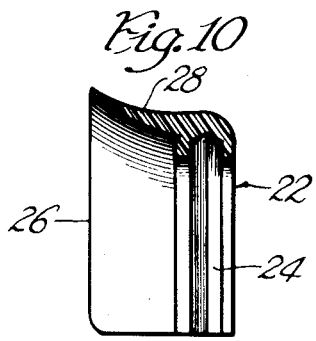
Inventor
Arthur F. Triphahn Patented Dec. 23, 1952

2,622,481

UNITED STATES PATENT OFFICE 2,622,481

SHIELD FOR VEHICLE REARVIEW MIRRORS

Arthur F. Triphahn, Chicago, Ill.

Application July 7, 1951, Serial No. 235,624

6 Claims. (Cl. 88—77)

This invention relates to a shield for a viewing device, and more particularly to a shield adapted to use on a rear-view mirror or the like which is mounted externally of a vehicle and adapted to be viewed from widely varying angles without appreciable restriction of the normally effective mirror area.

An object of my invention is to provide a shield for a viewing device such as a rear view mirror, which shield is constructed and arranged to provide protection of the reflecting mirror surface from the elements, such as snow, ice, sleet and rain, as well as to afford some protection for the user from glare from the mirror surface.

A further object of this invention is to provide a shield of the type referred to which is appropriately shaped to afford both protection for the mirror surface, and streamlining, as well as to permit the viewing of the mirror from a wide range of angles without appreciably restricting the normally effective mirror area. This, in the disclosed embodiment of the invention, involves giving the top of the shield a certain angular relation to the viewing device and the sides of the shield different angular relations to the device.

Other objects and advantages of the invention will be apparent from the following description and the accompanying drawings in which similar characters of reference indicate similar parts throughout the several views.

Fig. 1 is a perspective view of one form of my shield wherein it is illustrated in its application to a rear view mirror of the type commonly used on vehicles;

Fig. 2 is a front elevational view of the shield and mirror depicted in Fig. 1;

Fig. 3 is a rear elevational view of the same shield and mirror;

Fig. 4 is a sectional view taken on the line 4—4 of Fig. 2, but showing only the shield;

Fig. 5 is a sectional view taken on the line 5—5 of Fig. 2 but showing only the shield;

Fig. 6 is a perspective view of another form of the shield of the present invention shown applied to a mirror;

Fig. 7 is a front elevational view of the shield and mirror of Fig. 6;

Fig. 8 is a rear view of the shield;

Fig. 9 is a sectional view taken on the line 9—9 of Fig. 8, but showing only the shield; and Fig. 10 is a sectional view taken on the line 10—10 of Fig. 8.

In Fig. 1 of the accompanying drawings, wherein exemplary embodiments of my invention are shown for illustrative purposes, the reference character 10 designates a viewing device, such as a rear-view mirror of circular outer shape adapted to be fastened by a rod 11 to the exterior of a vehicle (not shown), the rod being movably connected to the mirror to provide for adjustment. The reference character 12 designates the shield of the present invention which is adapted to be applied to the circular mirror 10. This shield comprises a grooved arcuate gripping portion 13 of channel section and somewhat more than 180° in circular length, as shown in Fig. 2. Because of its semi-circular shape the gripping portion has in effect two opposed sides near its ends and an intermediate region connecting the sides. The shield also has a pair of side wings 14 and 15 and a middle or top wing 16 extending between the side wings so as to be joined with them in smooth curves as indicated at 17 and 18. The wings are joined directly to the gripping portion 13 at the midportion of the top wing 16 and at the lower portions of side wings 14. The wings are also joined indirectly to the gripping portion 13 by web portions 19 and 20 extending outwardly to meet the curved portions 17 and 18 between the side wings 14 and 15 and the middle wing 16. As seen in Figs. 4 and 5, the middle or top wing 16 extends more nearly perpendicular to the face of the mirror 10 or a plane contained in the gripping portion 13 than do the side wings 14 and 15. The angles of the wings may be described in another way. If one imagines two parallel planes perpendicular to the mirror and meeting the edges of the mirror where the side wings 14 and 15 do, and another plane transverse to the parallel planes and also perpendicular to the plane of the mirror and meeting the upper edge of the mirror where the middle or top wing 16 does, then the middle wing 16 is rotated upward from the transverse plane through a smaller angle than the side wings 14 and 15 are rotated outwardly from the parallel planes.

The three wings are disposed at an angle to the general plane (somewhat perpendicular) of the mirror surface, since they are to shield the reflecting surface of the mirror from foreign substances such as snow, ice, water and dirt, and yet should offer no more wind resistance than necessary. The middle or top wing 16 is most nearly perpendicular to the mirror surface, since dirt and water will come from above even when the vehicle is standing still, and a nearly perpendicular top wing will not block or limit the view of the user since in normal placement of the mirror, his eye will be below or about at the level of the mirror. The side wings 14 and 15, on the other hand, must be flared sufficiently to permit the user to see substantially the full mirror surface without obstruction from the nearer side wing 15, and to avoid reduction of the effective mirror area as a result of reflection in the mirror of the more remote side wing 14. Because of their projection in reference to the mirror surface, and because of their deflection of air and airborne materials during movements, the wings keep the mirror reflecting surface relatively clean and clear.

To provide symmetry and interchangeability, the side wings 14 and 15 may have the same flare or angle with respect to the mirror surface. Thus, the shield may be used on a mirror at either side of the vehicle. The channelled gripping portion 13 of the shield engages and preferably grips the upper half of the mirror margin, and fits the mirror with sufficient snugness to snap on, because the channelled gripping portion is slightly more than 180° in circular length, as aforesaid, whereby its ends cross a diametrical center line of the mirror.

The wings, in the disclosed structure, are curved somewhat, as indicated in Figs. 4 and 5, so that their angles with respect to a perpendicular to the mirror surface increase as the distance from the mirror increases. This improves the air deflecting properties of the wings. Moreover, it is a further element of my disclosed structure that the thickness of the wings decreases as the distance from the mirror increases.

Figs. 6 to 10, inclusive, show a modified form of shield that is suited for use with a rectangular rear view mirror 19, which is mounted by a rod 20 on the exterior of the vehicle, the rod, as in the first described form, being movably connected to the mirror. The shield 21 has a grooved gripping portion 22 which is composed of a middle region 23 and two side regions 24 and 25 that extend angularly from the opposite ends of middle section 23, so that the gripping portion conforms to the rectangular shape of the mirror. The mirror has side wings 26 and 27 extending from the regions 24 and 25 respectively of the grooved portion and a middle or top wing 28 extending from the region 23 of the grooved portion. The top wing 28 extends between the side wings 26 and 27 and is joined thereto by smoothly curved corner portions, as indicated at 29 and 30.

The top wing 28 is more nearly perpendicular to the reflecting surface of the mirror 19, or the plane contained in the grooved portion 22, than the side wings 26 and 27. As in the first described form, the top wing 28 is more nearly perpendicular to the mirror than are the side wings 26 and 27, for the reasons set forth in the description of the corresponding wings in the shield of Figs. 1 to 5. By being relatively perpendicular to the mirror, the top wing 28 shields the mirror from dirt or water coming from above or over the top of the mirror and offers relatively little wind resistance. The side wings 26 and 27 depart more from the perpendicular to the mirror so as to provide a minimum of interference with the operator's view of the mirror reflecting surface from a position at one side thereof. However, the side wings still protect the mirror at the sides and cooperate with the middle or top wing in keeping it clear. As is the case with the mirror of Figs. 1 to 5 inclusive, the side wings and middle wing may be described with respect to one another as being flared outwardly with respect to parallel planes perpendicular to the mirror surface and a transverse plane perpendicular to the reflecting surface of mirror. The middle wing 28 is flared outwardly from the transverse plane through a smaller angle than are the side wings 26 and 27 from the aforementioned parallel planes. The angle of each wing to the perpendicular to the mirror surface increases somewhat as the distance from the mirror increases. Also, the thickness of the wings decreases with this increase in distance.

Both forms of shields may be made of any suitable material such as plastic, metal, wood, cardboard, or rubber.

While I have illustrated a preferred embodiment of my invention, many modifications may be made without departing from the spirit of the invention, and I do not wish to be limited to the precise details of construction set forth, but desire to avail myself of all changes within the scope of the appended claims.

Having thus described my invention, what I claim as new and desire to secure by Letters Patent of the United States, is:

1. A unitary shield for a rear view mirror including a frame disposed exteriorly of a vehicle in a line of vision at an angle to the line of driving vision, comprising a resilient channeled portion extending in a plane and having a length in said plane to grip the margin of substantially the upper half of said frame, a top wing and opposite side wings extending laterally from one side of said channeled portion for shielding the reflecting surface of the mirror, the top wing being more nearly perpendicular to said plane than the side wings and the side wings diverging at substantial angles from a plane normal to said first plane and intermediate said side wings, whereby in the use of the shield one of said side wings is disposed laterally outwardly of the lines of vision of the adjacent edge of the mirror reflecting surface.

2. The structure according to claim 1, wherein said wings are relatively thick adjacent said channeled portion and taper to relatively thin free edge portions and wherein the inner end outer surfaces thereof are slightly convex and concave respectively for providing minimum wind resistance.

3. The structure according to claim 1, wherein said wings have their free edges in a plane parallel to and in relatively closely spaced relation to said first plane.

4. The structure according to claim 1, wherein said frame engaging portion is of arcuate formation and wherein said shield comprises portions parallel to said first plane disposed between said channeled portion and said wings.

5. The structure according to claim 4, wherein said arcuate frame engaging portion is of a length slightly greater than a semi-circle.

6. The structure according to claim 1, wherein said frame engaging portion is of substantially inverted U-form for engagement with the upper portion of a rectangular frame.

ARTHUR F. TRIPHAHN.

REFERENCES CITED

The following references are of record in the file of this patent:

UNITED STATES PATENTS

| Number | Name | Date |
|---|---|---|
| 1,311,681 | Doepker | July 29, 1919 |
| 1,518,985 | Kretschmer | Dec. 9, 1924 |
| 1,532,611 | Taylor | Apr. 7, 1925 |
| 2,336,413 | Michailovsky | Dec. 7, 1943 |
| 2,442,504 | Miller | June 1, 1948 |

FOREIGN PATENTS

| Number | Country | Date |
|---|---|---|
| 212,098 | Great Britain | Mar. 6, 1924 |
| 418,684 | Great Britain | Oct. 30, 1934 |
| 445,827 | Great Britain | Apr. 20, 1936 |